US010704407B2

(12) United States Patent
Barrett et al.

(10) Patent No.: US 10,704,407 B2
(45) Date of Patent: Jul. 7, 2020

(54) CERAMIC MATRIX COMPOSITE BLADE TRACK SEGMENTS

(71) Applicants:Rolls-Royce High Temperature Composites Inc., Cypress, CA (US); Rolls-Royce North American Technologies Inc., Indianapolis, IN (US)

(72) Inventors: Chris Barrett, Huntington Beach, CA (US); Joseph P. Lamusga, Long Beach, CA (US); Ted J. Freeman, Danville, IN (US)

(73) Assignees: Rolls-Royce High Temperature Composites Inc., Cypress, CA (US); Rolls-Royce North American Technologies Inc., Indianapolis, IN (US)

( * ) Notice: Subject to any disclaimer, the term of this patent is extended or adjusted under 35 U.S.C. 154(b) by 154 days.

(21) Appl. No.: 15/950,698

(22) Filed: Apr. 11, 2018

(65) Prior Publication Data

US 2018/0306045 A1  Oct. 25, 2018

Related U.S. Application Data

(60) Provisional application No. 62/488,385, filed on Apr. 21, 2017.

(51) Int. Cl.
*F01D 11/08* (2006.01)
*F01D 25/24* (2006.01)

(52) U.S. Cl.
CPC ............ *F01D 11/08* (2013.01); *F01D 25/243* (2013.01); *F01D 25/246* (2013.01); *F05D 2230/642* (2013.01); *F05D 2300/6033* (2013.01); *F05D 2300/6034* (2013.01)

(58) Field of Classification Search
None
See application file for complete search history.

(56) References Cited

U.S. PATENT DOCUMENTS

| | | | |
|---|---|---|---|
| 5,562,408 A | 10/1996 | Proctor et al. | |
| 6,733,235 B2 | 5/2004 | Alford et al. | |
| 7,278,820 B2 * | 10/2007 | Keller | F01D 11/08 |
| | | | 415/173.1 |
| 7,950,234 B2 * | 5/2011 | Radonovich | F01D 11/122 |
| | | | 415/173.1 |
| 8,246,299 B2 * | 8/2012 | Razzell | F01D 11/005 |
| | | | 415/173.1 |
| 8,740,552 B2 * | 6/2014 | Marusko | F01D 9/04 |
| | | | 415/173.1 |
| 9,039,358 B2 | 5/2015 | Tholen et al. | |
| 9,458,726 B2 | 10/2016 | Lamusga et al. | |
| 9,506,356 B2 | 11/2016 | Loftus et al. | |
| 2013/0004306 A1 * | 1/2013 | Albers | F01D 25/246 |
| | | | 415/200 |
| 2014/0271145 A1 * | 9/2014 | Thomas | F01D 11/08 |
| | | | 415/173.1 |

(Continued)

*Primary Examiner* — Woody A Lee, Jr.
*Assistant Examiner* — Jason G Davis
(74) *Attorney, Agent, or Firm* — Barnes & Thornburg LLP

(57) ABSTRACT

A turbine shroud adapted for use in a gas turbine engine includes an attachment feature and a body. The attachment feature and the body are constructed of ceramic matrix composite materials. In an illustrative embodiment, the ceramic matrix composite materials form a blade track segment.

14 Claims, 5 Drawing Sheets

(56) References Cited

U.S. PATENT DOCUMENTS

2016/0258304 A1 9/2016 Sippel et al.
2016/0290140 A1 10/2016 Thomas et al.
2017/0002674 A1 1/2017 Vetters et al.

* cited by examiner

CERAMIC MATRIX COMPOSITE BLADE TRACK SEGMENTS

CROSS REFERENCE TO RELATED APPLICATIONS

This application claims priority to and the benefit of U.S. Provisional Patent Application No. 62/488,385, filed 21 Apr. 2017, the disclosure of which is now expressly incorporated herein by reference.

FIELD OF THE DISCLOSURE

The present disclosure relates generally to gas turbine engines, and more specifically to turbine shroud assemblies including blade track segments made of ceramic matrix composite material.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include blade track segments made of ceramic matrix composite materials designed to withstand very high temperatures.

SUMMARY

The present disclosure may comprise one or more of the following features and combinations thereof.

A blade track segment adapted for use in a turbine shroud assembly incorporated into a gas turbine engine is disclosed in this paper. The blade track segment includes a body and an attachment feature. The blade track segment comprises ceramic matrix composite materials.

In illustrative embodiments, the body is formed to provide a polygonal cross-sectional shape defining an interior cavity. The body may include a runner panel that extends partway around a central axis, a forward panel that extends radially outward and axially aft of a forward edge of the runner panel, and an aft panel that extends radially outward and axially forward of an aft edge of the runner panel. The attachment feature may be arranged radially outward of the body and may be configured to be coupled to other components of the turbine shroud assembly when the blade track segment is assembled into the gas turbine engine.

In illustrative embodiments, the ceramic matrix composite materials of the blade track segment may include a sheet of reinforcement material. The sheet of reinforcement material may have free ends configured to form at least part of the attachment portion and a midsection configured to wrap around the interior cavity and form at least part of the runner panel, the forward panel, and the aft panel of the body.

In illustrative embodiments, the ceramic matrix composite materials of the blade track segment may include a tube of reinforcement material constructed so as not to include a seam. The tube of reinforcement material may be shaped to surround the interior the interior cavity of the body and form at least part of the body. In illustrative embodiments, the sheet of reinforcement material and the tube of reinforcement material may be co-infiltrated with ceramic matrix material.

In illustrative embodiments, the forward panel of the body and the aft panel of the body may converge and form an interface of the body with the attachment feature. The ceramic matrix composite materials may include filler reinforcement material arranged radially-inward and/or radially-outward of the interface of the body with the attachment feature to take up space as the forward panel and the aft panel diverge from one another. The filler reinforcement material may include loose reinforcement fibers. The sheet of reinforcement material and the loose reinforcement fibers may be co-infiltrated with ceramic matrix material.

In illustrative embodiments, the ceramic matrix composite materials of the blade track segment may include a tube of reinforcement material that is three-dimensionally woven so as not to include a seam. The tube of reinforcement material may be shaped to surround the interior the interior cavity of the body and form at least part of the body. The filler reinforcement material may be formed from three-dimensionally woven fibers of the tube of reinforcement material. The sheet of reinforcement material and the tube of reinforcement material may be co-infiltrated with ceramic matrix material.

In illustrative embodiments, the sheet of reinforcement material may include end sections that diverge from one another in the axial direction as they extend radially outward from the midsection to the free ends and that form at least part of the attachment feature. The attachment feature may form a dovetail cross-sectional shape.

In illustrative embodiments, the ceramic matrix composite materials of the blade track segment may include filler reinforcement material arranged circumferentially between the end sections of the sheet of reinforcement material. The sheet of reinforcement material and the filler reinforcement material may be co-infiltrated with ceramic matrix material. In some embodiments, the attachment feature forms a T-shaped cross-sectional shape.

In illustrative embodiments, the forward panel of the body and the aft panel of the body may converge. The sheet of reinforcement material may include end sections that extend radially outward from the midsection of the sheet of reinforcement material to the free ends of the sheet of reinforcement material to form at least part of the attachment feature. The attachment feature may include pins that extend axially through and beyond the end sections of the sheet of reinforcement material in forward and aft directions.

In illustrative embodiments, the body has a triangular cross-sectional shape when viewed circumferentially around the central axis. The triangular cross-sectional shape may be symmetric or may be asymmetric.

According to another aspect of the present disclosure, a blade track segment adapted for use in a turbine shroud assembly incorporated into a gas turbine engine is provided. The blade track segment may include a body and an attachment feature. The blade track segment comprises ceramic matrix composite materials.

In illustrative embodiments, the body may be formed to provide a polygonal cross-sectional shape defining an interior cavity. The attachment feature may be arranged radially outward of the body and configured to be coupled to other components of the turbine shroud assembly when the blade track segment is assembled into the gas turbine engine.

In illustrative embodiments, the body may include a runner panel that extends partway around a central axis, a forward panel that extends radially outward and axially aft of a forward edge of the runner panel, and an aft panel that extends radially outward and axially forward of an aft edge of the runner panel.

In illustrative embodiments, the ceramic matrix composite materials of the blade track segment may include a tube of reinforcement material constructed so as not to include a seam. The tube of reinforcement material may be shaped to surround the interior the interior cavity of the body and may form at least part of the body.

In illustrative embodiments, the body may have a triangular cross-sectional shape when viewed circumferentially around the central axis. The shape may be symmetrical or asymmetrical.

In illustrative embodiments, the tube of reinforcement material may be three-dimensionally woven so as not to form the seam. The tube of reinforcement material may form at least part of the attachment feature. The attachment features may form one of a dovetail cross-sectional shape and a T-shaped cross-sectional shape.

In illustrative embodiments, the ceramic matrix composite materials of the blade track segment may include a sheet of reinforcement material wrapped around the tube of reinforcement material and the interior cavity to form at least part of the body. The tube of reinforcement material and the sheet of reinforcement material may be co-infiltrated with ceramic matrix material.

In illustrative embodiments, the tube of reinforcement material and the sheet of reinforcement material may each form at least part of the attachment feature. The attachment feature may include pins that extend through and beyond portions of the tube of reinforcement material and the sheet of reinforcement material included in the attachment feature.

These and other features of the present disclosure will become more apparent from the following description of the illustrative embodiments.

DETAILED DESCRIPTION OF THE DRAWINGS

Figure 1:
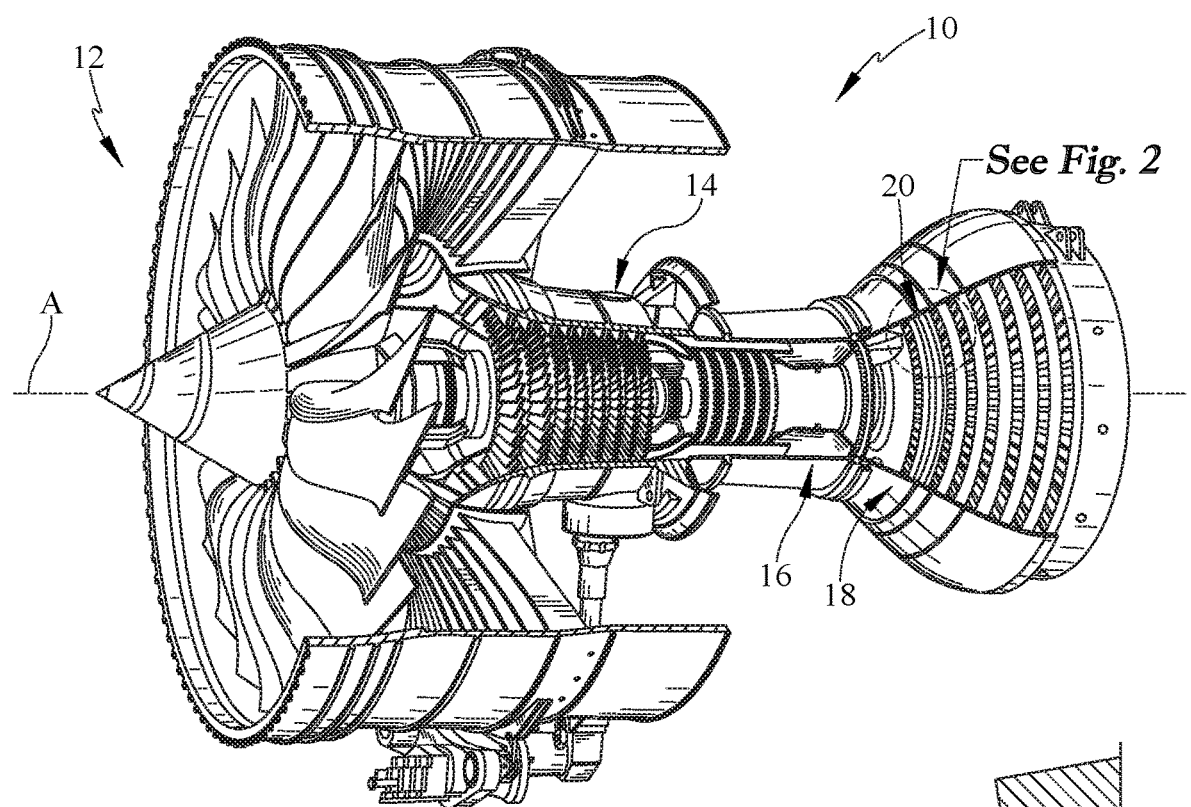
FIG. 1 is a cut-away perspective view of a gas turbine engine showing that the exemplary engine includes a fan driven by an engine core having a compressor, a combustor, and a turbine.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis A and drive the compressor 14 and the fan 12.

Figure 2:
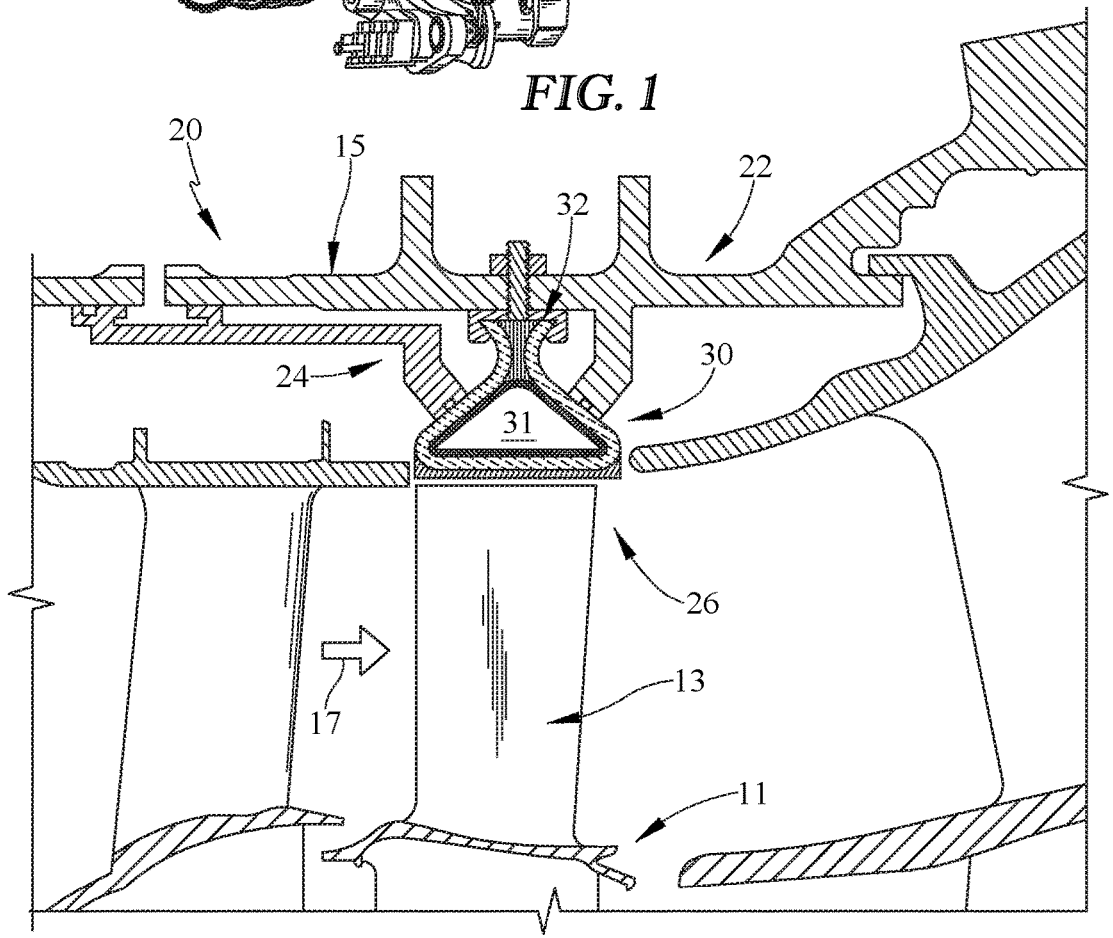
FIG. 2 is a partial cross-sectional view of the gas turbine engine of FIG. 1 showing the arrangement of a turbine shroud assembly radially outward from blades of a turbine wheel assembly to suggest that the turbine shroud blocks gasses from passing over the blades without interacting with the blades.

The turbine 18 includes at least one turbine wheel assembly 11 and a turbine shroud assembly 20 positioned to surround the turbine wheel assembly 11 as shown in FIGS. 1 and 2. Turbine shroud assembly 20 is coupled to an outer turbine case 15 of the gas turbine engine 10. The turbine wheel assembly 11 includes a plurality of blades 13 coupled to a rotor disk for rotation therewith. The hot, high pressure combustion products from the combustor 16 are directed toward the blades 13 of the turbine wheel assemblies 11 along a flow path 17. The blades 13 are in turn pushed by the combustion products to cause the turbine wheel assembly 11 to rotate; thereby, driving the rotating components of the compressor 14 and/or the fan 12.

Figure 3:
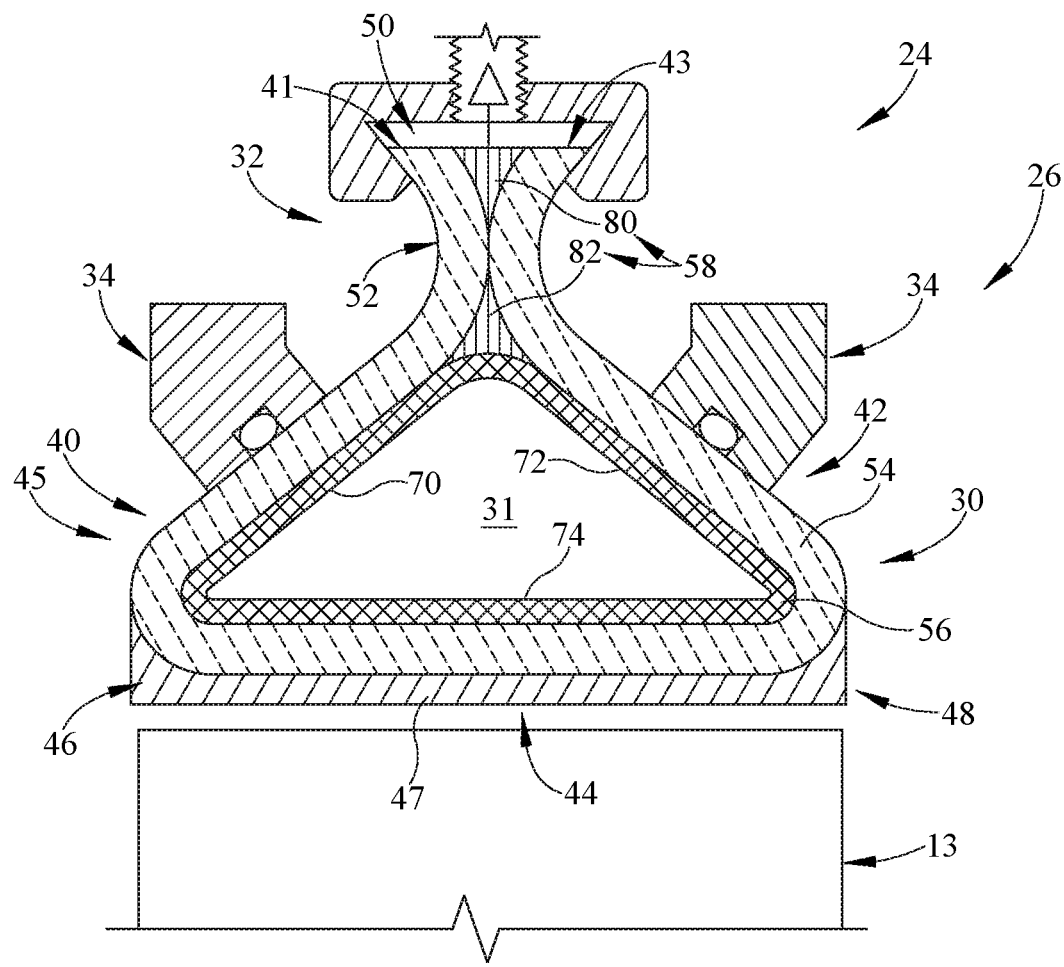
FIG. 3 is a detail view of a portion of FIG. 2 showing that the turbine shroud segment includes blade track segment having a body positioned radially outward of the turbine blades that defines an interior cavity and an attachment feature extending radially outward from the body to couple the turbine shroud within the gas turbine engine.

Turbine shroud assembly 20 extends around the turbine wheel assembly 11 to block combustion products from passing over the blades 13 without pushing the blades 13 to rotate as suggested in FIG. 2. In the illustrative embodiment, turbine shroud assembly 20 is made up of a number of shroud segments 22, one of which is shown in FIG. 3. Each shroud segment 22 extends only part-way around the central axis A and cooperates with other shroud segments 22 to surround the turbine wheel assembly 11. The shroud segments 22 may be sealed against one another, such as by strip seal members, to provide a continuous turbine shroud assembly 20.

Each turbine shroud segment 22 illustratively includes a carrier 24 and a blade track segment 26 as shown in FIGS. 2 and 3. Carrier 24 is a metallic component mounted in engine 10 and is configured to support blade track segment 26 in position adjacent to the blades 13 of the turbine wheel assembly 11. Blade track segment 26 is a ceramic-matrix composite component adapted to withstand high temperatures and directly faces blades 13 that interface with high temperature gasses.

Blade track segment 26 includes a body 30 and an attachment feature 32 as shown in FIG. 2. Body 30 is formed to provide a polygonal cross-sectional shape to define an interior cavity 31. Attachment feature 32 is arranged radially outward of body 30 and is configured to be coupled to other components of turbine shroud assembly 22 when blade track segment 26 is assembled into gas turbine engine 10. Body 30 and attachment feature 32 comprise ceramic matrix composite materials including a sheet of reinforcement material 54, a tube of reinforcement material 56, and filler reinforcement material 58 as shown in FIGS. 3 and 4.

Figure 4:
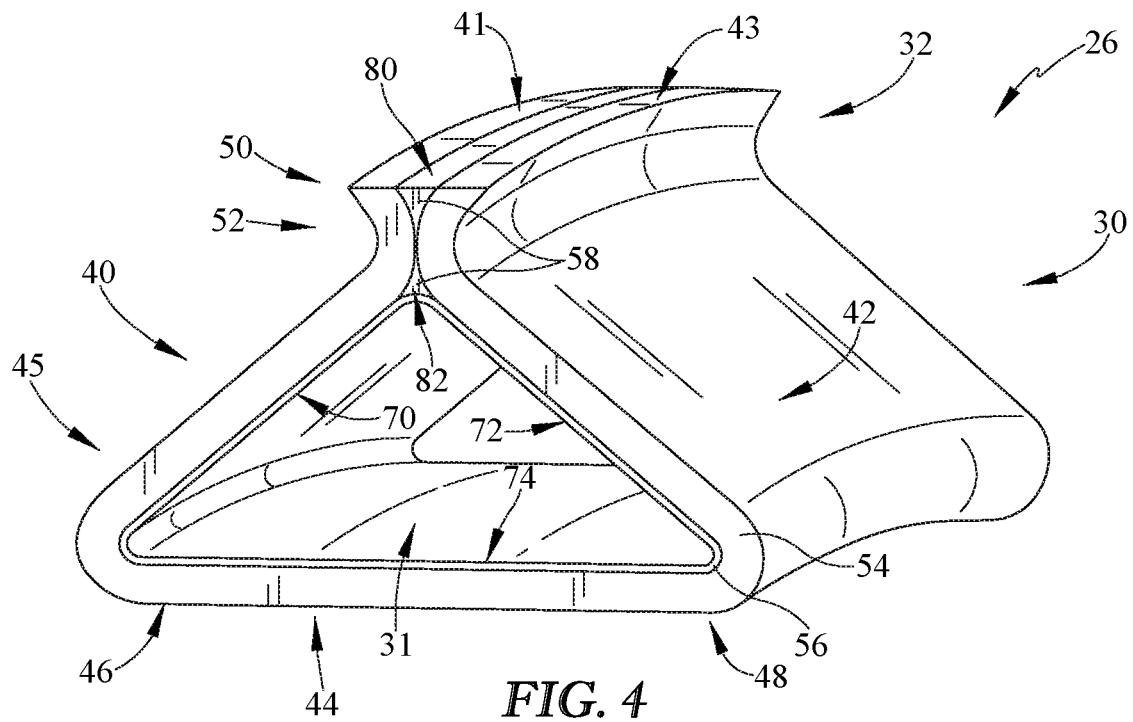
FIG. 4 is a perspective view of an illustrative example of the blade track segment included in FIG. 3 showing that the body and the attachment feature are formed by a ceramic reinforcement material sheet, a ceramic reinforcement material tube, and ceramic reinforcement filler material and showing that the attachment feature is formed with reinforcement filler material within gaps formed between the ceramic reinforcement material sheet and the ceramic reinforcement material tube.

Body 30 has a triangular shape when viewed in the circumferential direction and includes a forward panel 40, an aft panel, 42, and a runner panel 44 as shown in FIGS. 2-4. While the body 30 illustratively has a generally equilateral triangle shape, it is contemplated that the shape need not be symmetric and may have differently sized sides and/or formed angles. Forward panel 40 and aft panel 42 are each supported by corresponding carrier location features 34 as shown in FIGS. 2 and 3. Forward panel 40 extends radially outward and axially aft of a forward edge 46 of runner panel 44. Aft panel 42 extends radially outward and axially forward of an aft edge 48 of runner panel 44. Runner panel 44 extends between and interconnects forward panel 40 and aft panel 42 at forward edge 46 and aft edge 48 of blade track segment 26. Runner panel 44 is arranged to engage blades 13 of turbine 18 and may include a coating 47 disposed on a radially inner surface of runner panel 44 as shown in FIGS. 2 and 3.

Attachment feature 32 has a dovetail shape when viewed in the circumferential direction and includes a flared root 50 and a stem 52 as shown in FIGS. 2-4. Attachment feature 32 is configured to support blade track segment 26 within gas turbine engine 10. Flared root 50 is formed to extend radially outward and axially both forward and aft of stem 52 to engage with carrier 24. Stem 52 extends radially outward from body 30 and defines a transition region between flared root 50 and body 30. Forward panel 40 and aft panel 42 extend radially outward and converge to form an interface defining stem 52 and, subsequently, extend radially outward and diverge to define flared root 50.

The sheet of reinforcement material 54 includes free ends 41, 43 and midsection 45 as shown in FIGS. 2-4. Free ends 41, 43 correspond to forward panel and aft panel, respectively, and define at least a part of flared root 50 and stem 52 of attachment feature 32. Midsection 45 is configured to wrap around interior cavity 31 and form at least a part of forward panel 40, aft panel 42, and runner panel 44. Midsection 45 is also configured to be engaged by carrier location features 34 and blades 13 of turbine 18.

The tube of reinforcement material 56 is seamless and shaped to surround interior cavity 31 of body 30 and includes a forward surface 70, an aft surface 72 and a runner surface 74 ad shown in FIGS. 2-5, 8, and 9. Forward surface 70 is arranged within interior cavity 31 along forward panel 40 of body 30. Aft surface 72 is arranged within interior cavity 31 along aft panel 42 of body 30. Runner surface 74 is arranged within interior cavity 31 along runner panel 44 of body 30. Together, forward surface 70, aft surface 72, and runner surface 74 are constructed of a three-dimensional woven or braided ceramic ply and form at least a part of forward panel 40, aft panel 42 and runner panel 44 of body 30. The tube of reinforcement material 56 and the sheet of reinforcement material 54 are co-infiltrated with ceramic matrix material.

The filler reinforcement material 58 includes radially-outer filler material 80 and radially-inner filler material 82 as shown in FIGS. 2-4. Radially-outer filler material 80 is arranged between forward panel 40 and aft panel 42 within flared root 50. Radially-outer filler material 80 takes up space within flared root 50 as forward panel 40 and aft panel 42 diverge away from one another. Radially-inner filler material 82 is arranged between forward panel 40, aft panel 42, and the tube of reinforcement material 56. Radially-inner filler material takes up space radially inward from the interface defining stem 52 between the sheet of reinforcement material 54 and the tube of reinforcement material 56.

Both radially-outer filler material 80 and radially-inner filler material 82 include loose reinforcement fibers that are co-infiltrated with ceramic matrix material. Radially-outer filler material 80 and radially-inner filler material 82 extend circumferentially through attachment feature 32.

In some embodiments, one or more of the sheet of reinforcement material 54, the tube of reinforcement material 56, and filler reinforcement material 58 may be used together or separately to form blade track segment 26. In other embodiments, the sheet of reinforcement material 54, the tube of reinforcement material 56, and filler reinforcement material 58 may be arranged in various locations to form blade track segment 26. Examples of various combinations of these ceramic matrix composite materials are illustrated in FIGS. 5-10.

Figure 5:
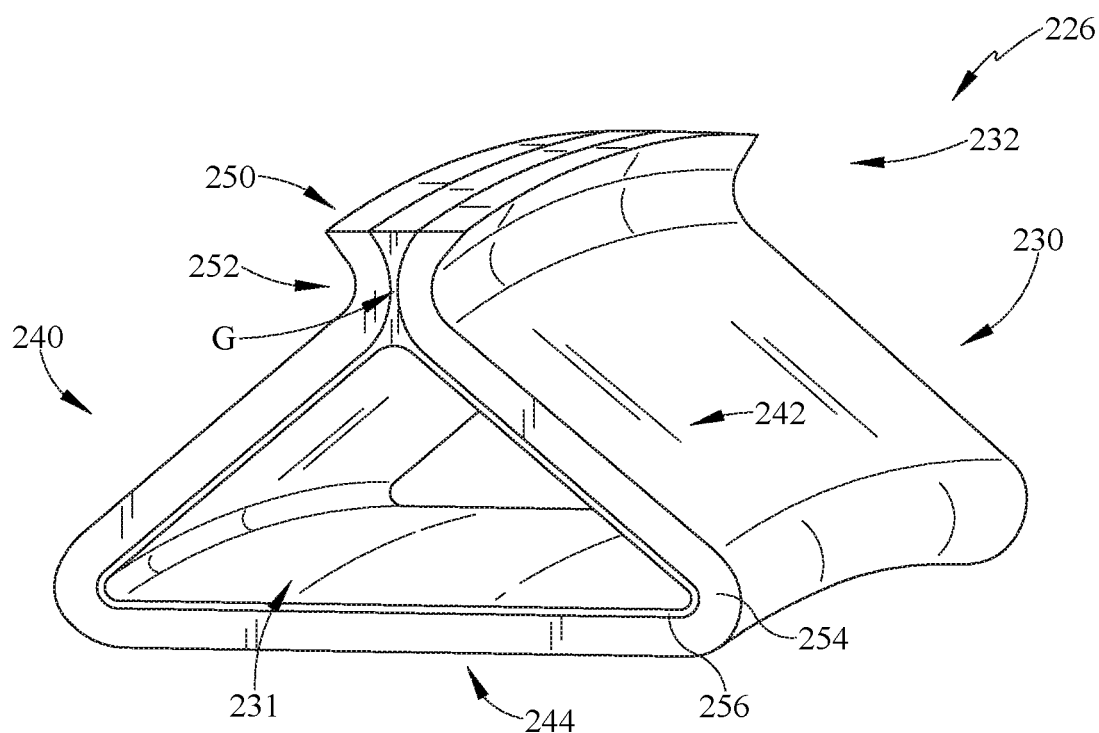
FIG. 5 is a perspective view of another illustrative example of the blade track segment showing that the reinforcement filler material is integral to the reinforcement material tube and extends from the reinforcement material tube all the way through the attachment feature.

A second blade track segment 226 is shown in FIG. 5. The blade track segment 226 is configured for use in the engine 10 and is substantially similar to the blade track segment 26 shown in FIGS. 2-4 and described herein. Accordingly, similar reference numbers in the 200 series indicate features that are generally shared between the blade track segment 26 and the blade track segment 226 except as modified in the description below and drawings presented. The description of the blade track segment 26 is hereby incorporated by reference to apply to the blade track segment 226, except in instances when it conflicts with the specific description and drawings of the blade track segment 226.

Blade track segment 226 includes a sheet of reinforcement material 254 and a tube of reinforcement material 256 as shown in FIG. 5. The tube of reinforcement material 256 has been three-dimensionally woven so as not to include a seam and is configured to extend from body 230 through attachment feature 232. As such, the tube of reinforcement material 256 replaces the filler reinforcement material 58 of blade track segment 26.

The tube of reinforcement material 256 and the sheet of reinforcement material 254 each form at least a part of body 230 and attachment feature 232 as shown in FIG. 5. Forward panel 240 and aft panel 242 converge at stem 252 and provide a gap G at the interface between forward panel 240 and aft panel 242. The tube of reinforcement material 256 extends through stem 252 and into flared root 250 to fill gap G. The sheet of reinforcement material 254 and the tube of reinforcement material 256 are co-infiltrated with ceramic matrix material.

Figure 6:
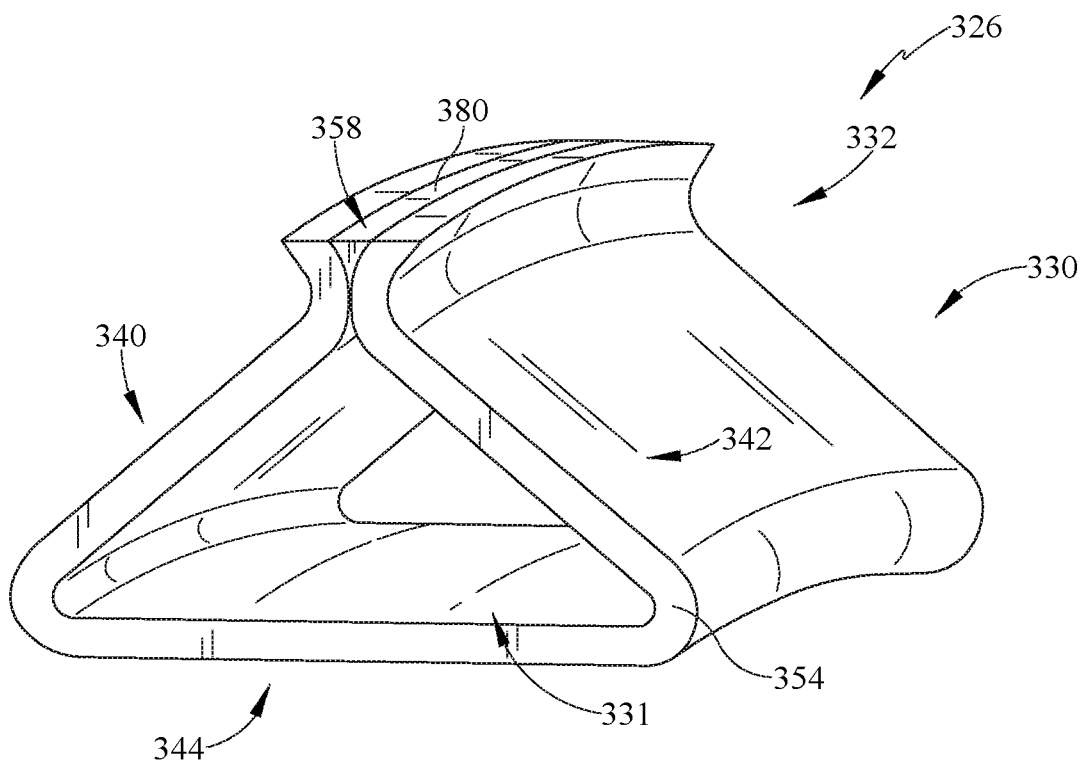
FIG. 6 is a perspective view of another illustrative example of the blade track segment showing that the blade track segment is formed without the reinforcement material tube.

A third blade track segment 326 is shown in FIG. 6. The blade track segment 326 is configured for use in the engine 10 and is substantially similar to the blade track segment 26 shown in FIGS. 2-4 and described herein. Accordingly, similar reference numbers in the 300 series indicate features that are generally shared between the blade track segment 26 and the blade track segment 326 except as modified in the description below and drawings presented. The description of the blade track segment 26 is hereby incorporated by reference to apply to the blade track segment 326, except in instances when it conflicts with the specific description and drawings of the blade track segment 326.

Blade track segment 326 includes the sheet of reinforcement material 354 and filler reinforcement material 358 as shown in FIG. 6. Filler reinforcement material 358 is formed by radially-outer filler material 380 arranged within flared root 350 between free end 341 of forward panel 340 and free end 343 of aft panel 342. The sheet of reinforcement material 354 and filler reinforcement material 358 are co-infiltrated with ceramic matrix material.

Figure 7:
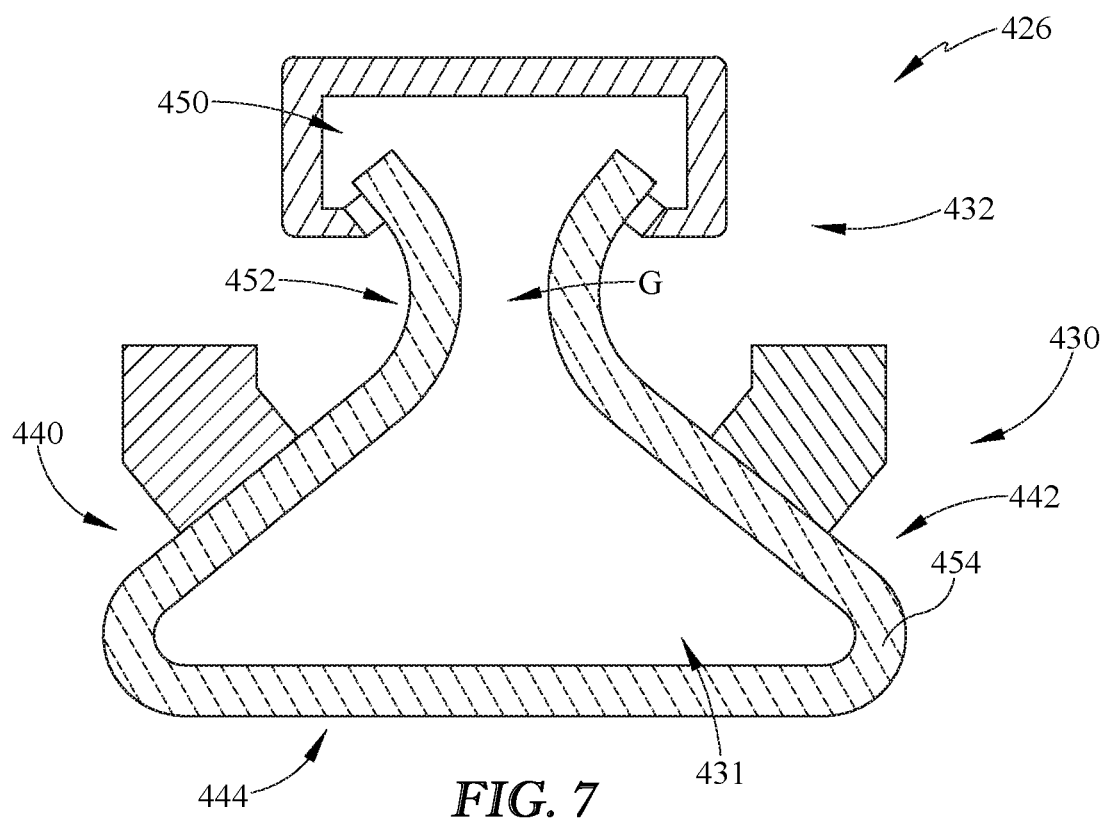
FIG. 7 is a sectional view of another illustrative example of the blade track segment showing that the blade track segment is formed without the reinforcement material tube and the reinforcement filler material.

A fourth blade track segment 426 is shown in FIG. 7. The blade track segment 426 is configured for use in the engine 10 and is substantially similar to the blade track segment 26 shown in FIGS. 2-4 and described herein. Accordingly, similar reference numbers in the 400 series indicate features that are generally shared between the blade track segment 26 and the blade track segment 426 except as modified in the description below and drawings presented. The description of the blade track segment 26 is hereby incorporated by reference to apply to the blade track segment 426, except in instances when it conflicts with the specific description and drawings of the blade track segment 426.

Blade track segment 426 includes a sheet of reinforcement material 454 as shown in FIG. 7. Body 430 and attachment feature 432 of blade track segment 426 are formed without any tube of reinforcement material or filler reinforcement material. Forward panel 440 and aft panel 442 converge and provide a gap G within stem 452 of attachment feature 432. However, in other embodiments, no gap may be present.

Figure 8:
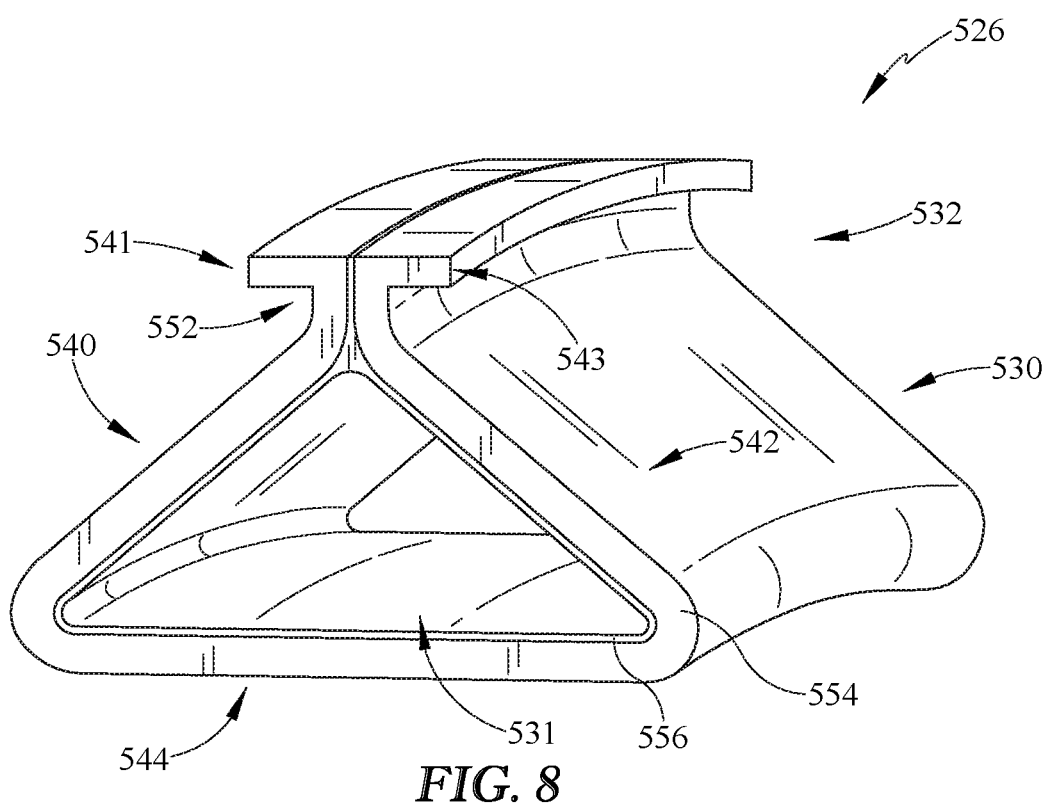
FIG. 8 is a perspective view of another illustrative example of the blade track segment showing that the attachment feature has a t-shaped cross section.

A fifth blade track segment 526 is shown in FIG. 8. The blade track segment 526 is configured for use in the engine 10 and is substantially similar to the blade track segment 26 shown in FIGS. 2-4 and described herein. Accordingly, similar reference numbers in the 500 series indicate features that are generally shared between the blade track segment 26 and the blade track segment 526 except as modified in the description below and drawings presented. The description of the blade track segment 26 is hereby incorporated by reference to apply to the blade track segment 526, except in instances when it conflicts with the specific description and drawings of the blade track segment 526.

Blade track segment 526 includes a body 530 and an attachment feature 532 as shown in FIG. 8. Body 530 has a triangular shape when viewed in the circumferential direction. Attachment feature 532 extends radially outward from body 630. Body 530 and attachment feature 532 are constructed of ceramic matrix composite materials comprising a sheet of reinforcement material 554 and a tube of reinforcement material 556. The sheet of reinforcement material has free ends 541 and 543 that form at least a portion of attachment feature 532. The tube of reinforcement material 556 is three-dimensionally woven so as not to include a seam.

Attachment feature 532 has a T-shaped cross section when viewed in the circumferential direction as shown in FIG. 8. Free ends 541 and 543 of the sheet of reinforcement material 554 diverge axially forward and aft to provide the T-shaped cross section of attachment feature 532. The tube of reinforcement material forms at least a part of attachment feature as extends from body 530 through attachment feature 532 between free ends 541 and 543.

Figure 9:
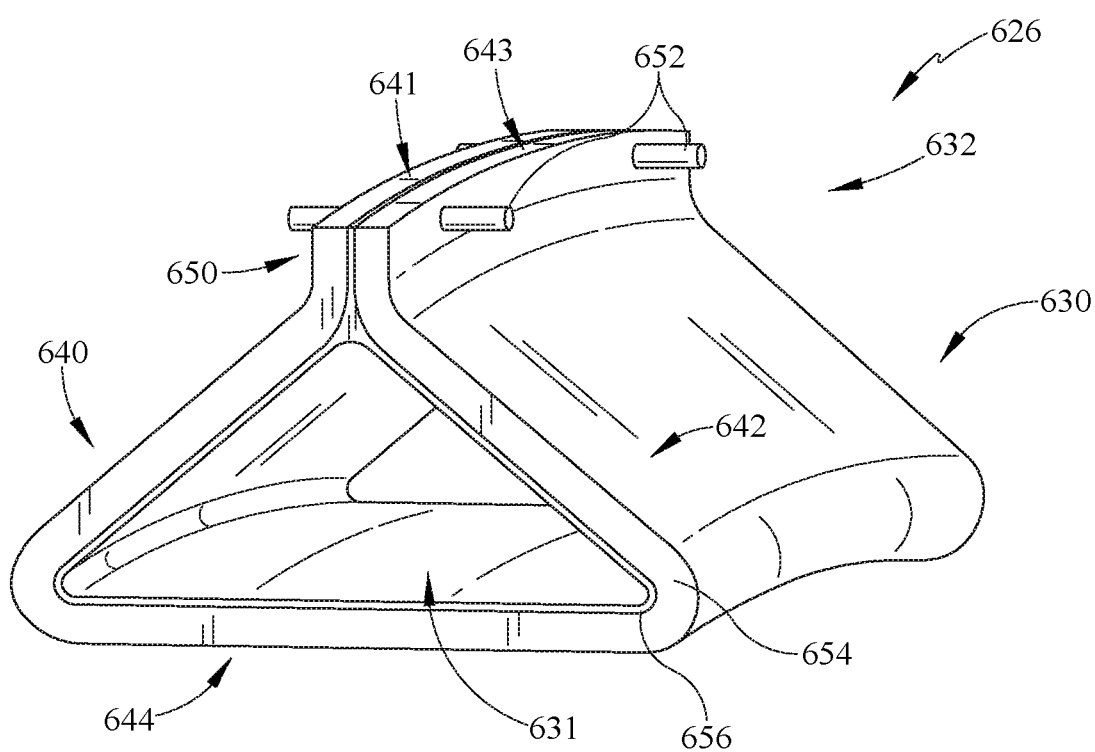
FIG. 9 is a perspective view of another illustrative example of the blade track segment showing that the attachment feature includes pins that extend axially through the attachment feature.

A sixth blade track segment 626 is shown in FIG. 9. The blade track segment 626 is configured for use in the engine 10 and is substantially similar to the blade track segment 26 shown in FIGS. 2-4 and described herein. Accordingly, similar reference numbers in the 600 series indicate features that are generally shared between the blade track segment 26 and the blade track segment 626 except as modified in the description below and drawings presented. The description of the blade track segment 26 is hereby incorporated by reference to apply to the blade track segment 626, except in instances when it conflicts with the specific description and drawings of the blade track segment 626.

Blade track segment 626 includes a body 630 and an attachment feature 632 as shown in FIG. 9. Body 630 has a triangular shape when viewed in the circumferential direction. Attachment feature 632 extends radially outward from body 630. Body 630 and attachment feature 632 are constructed of ceramic matrix composite materials comprising a sheet of reinforcement material 654 and a tube of reinforcement material 656. The sheet of reinforcement material has free ends 641 and 643 that form at least a portion of attachment feature 632. The tube of reinforcement material 656 is three-dimensionally woven so as not to include a seam.

Attachment feature 632 includes a stem 650 and a plurality of pins 652 for supporting blade track segment 626 within engine 10 as shown in FIG. 9. Stem 650 is formed by free ends 641 and 642 of the sheet of reinforcement material 654 and at least a part of the tube of reinforcement material 656. The plurality of pins 652 extend axially through attachment feature 632 and secure blade track segment 626 to engine 10 with corresponding holes or slots (not shown).

Figure 10:
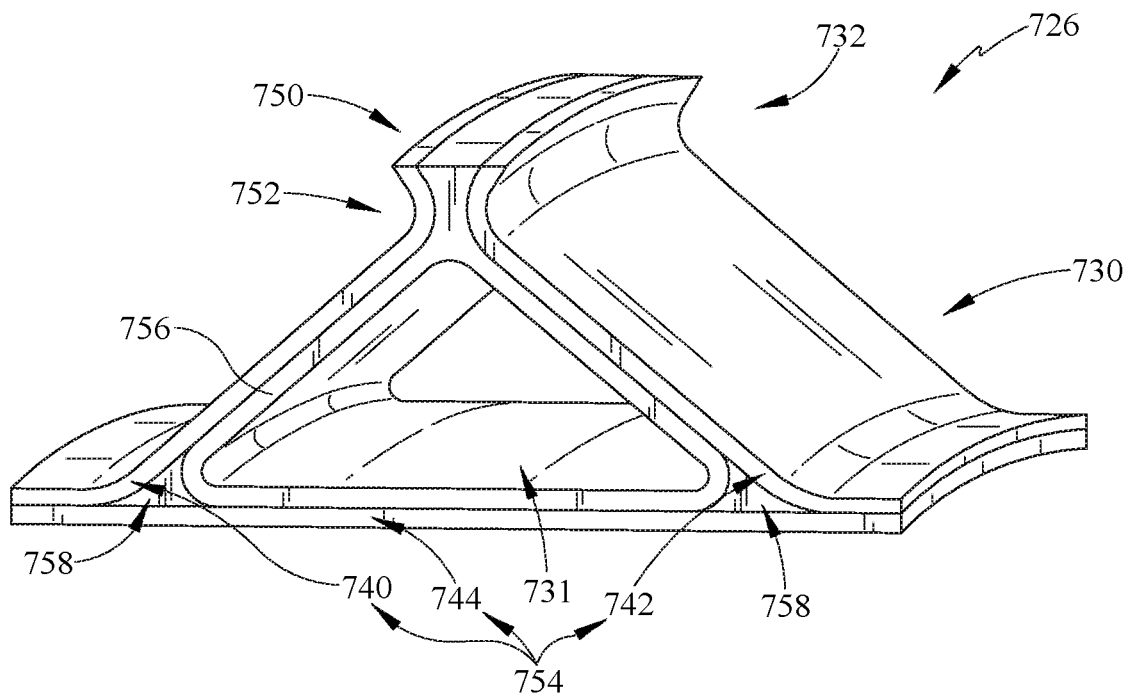
FIG. 10 is a perspective view of another illustrative example of the blade track segment showing that the blade track segment is formed by a plurality of ceramic reinforcement material sheets.

A seventh blade track segment 726 is shown in FIG. 10. The blade track segment 726 is configured for use in the engine 10 and is substantially similar to the blade track segment 26 shown in FIGS. 2-4 and described herein. Accordingly, similar reference numbers in the 700 series indicate features that are generally shared between the blade track segment 26 and the blade track segment 726 except as modified in the description below and drawings presented. The description of the blade track segment 26 is hereby incorporated by reference to apply to the blade track segment 726, except in instances when it conflicts with the specific description and drawings of the blade track segment 726.

Blade track segment 726 includes a body 730 and an attachment feature 732 as shown in FIG. 10. Body 730 has a triangular shape when viewed in the circumferential direction. Attachment feature 732 extends radially outward from body 730 and has a dovetail shape when viewed in the circumferential direction.

Body 730 and attachment feature 732 are constructed of ceramic matrix composite materials comprising a plurality of sheets of reinforcement material 754, a tube of reinforcement material 756, and filler reinforcement material 758 as shown in FIG. 10. The plurality of sheets of reinforcement material 654 include a forward panel 740, an aft panel 742, and a runner panel 744 that form at least a portion of body 730 and attachment feature 732. The tube of reinforcement material 756 is three-dimensionally woven so as not to include a seam. The filler reinforcement material 758 takes up space between the plurality of sheets of reinforcement material 754 and the tube of reinforcement material 756.

Forward panel 740 and aft panel 742 extend radially outward and converge to form at least a portion of attachment feature 732 as shown in FIG. 10. Runner panel 744 extends axially from forward panel 740 and aft panel 742.

The tube of reinforcement material 756 is three-dimensionally woven so as to not include a seam and is arranged between the plurality of sheets of reinforcement material 754 to define an interior cavity 731 as shown in FIG. 10. The tube of reinforcement material 756 forms at least a portion of body 730 and attachment feature 732.

Filler reinforcement material 758 is arranged between forward panel 740, runner panel 744, and the tube of reinforcement material 756, and is arranged between aft panel 742, runner panel 744, and the tube of reinforcement material 756. Filler reinforcement material 758 forms at least a portion of body 730.

The illustrative embodiment may improve manufacturability while still maintaining rigidity and strength. Additionally, the illustrative embodiment may offer versatility of attachment methods and could be modified to offer different sealing arrangements as necessary.

In illustrative embodiments, the blade track segment includes a dovetail attachment with a non-connected dovetail feature. In illustrative embodiments, the blade track segment includes dovetail location and no internal reinforcement. In illustrative embodiments, the blade track segment includes a braided core. In illustrative embodiments, the blade track segment includes an attachment feature with a thicker tube of reinforcement material portion. In illustrative embodiments, the blade track segment includes pin style location features. In illustrative embodiments, the blade track segment includes a runner panel with tail features for sealing.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A blade track segment adapted for use in a turbine shroud assembly incorporated into a gas turbine engine, the blade track segment comprising
a body comprising ceramic matrix composite material and formed to provide a polygonal cross-sectional shape defining an interior cavity, the body including a runner panel that extends partway around a central axis, a forward panel that extends radially outward and axially aft of a forward edge of the runner panel, and an aft panel that extends radially outward and axially forward of an aft edge of the runner panel,
an attachment feature comprising ceramic matrix composite material and arranged radially outward of the body and configured to be coupled to other components of the turbine shroud assembly when the blade track segment is assembled into the gas turbine engine, and
wherein the ceramic matrix composite materials include a sheet of reinforcement material that has free ends configured to form at least part of the attachment feature and a midsection configured to wrap around the interior cavity and form at least part of the runner panel, the forward panel, and the aft panel of the body,
wherein the ceramic matrix composite materials include a tube of reinforcement material constructed so as not to include a seam, and wherein the tube of reinforcement material is shaped to surround the interior cavity of the body and form at least part of the body.

2. The blade track segment of claim 1, wherein the sheet of reinforcement material and the tube of reinforcement material are co-infiltrated with ceramic matrix material.

3. A blade track segment adapted for use in a turbine shroud assembly incorporated into a gas turbine engine, the blade track segment comprising
a body comprising ceramic matrix composite material and formed to provide a polygonal cross-sectional shape defining an interior cavity, the body including a runner panel that extends partway around a central axis, a forward panel that extends radially outward and axially aft of a forward edge of the runner panel, and an aft panel that extends radially outward and axially forward of an aft edge of the runner panel,
an attachment feature comprising ceramic matrix composite material and arranged radially outward of the body and configured to be coupled to other components of the turbine shroud assembly when the blade track segment is assembled into the gas turbine engine, and
wherein the ceramic matrix composite materials include a sheet of reinforcement material that has free ends configured to form at least part of the attachment feature and a midsection configured to wrap around the interior cavity and form at least part of the runner panel, the forward panel, and the aft panel of the body,
wherein the forward panel of the body and the aft panel of the body converge and form an interface of the body with the attachment feature,
wherein the ceramic matrix composite materials include filler reinforcement material arranged radially-inward and/or radially-outward of the interface of the body with the attachment feature to take up space as the forward panel and the aft panel diverge from one another.

4. The blade track segment of claim 3, wherein the filler reinforcement material includes loose reinforcement fibers, and wherein the sheet of reinforcement material and the loose reinforcement fibers are co-infiltrated with ceramic matrix material.

5. The blade track segment of claim 3, wherein the ceramic matrix composite materials include a tube of reinforcement material that is three-dimensionally woven so as not to include a seam, wherein the tube of reinforcement material is shaped to surround the interior the interior cavity of the body and form at least part of the body, wherein the filler reinforcement material is formed from three-dimensionally woven fibers of the tube of reinforcement material, and wherein the sheet of reinforcement material and the tube of reinforcement material are co-infiltrated with ceramic matrix material.

6. A blade track segment adapted for use in a turbine shroud assembly incorporated into a gas turbine engine, the blade track segment comprising
a body comprising ceramic matrix composite material and formed to provide a polygonal cross-sectional shape defining an interior cavity, the body including a runner panel that extends partway around a central axis, a forward panel that extends radially outward and axially aft of a forward edge of the runner panel, and an aft panel that extends radially outward and axially forward of an aft edge of the runner panel, an attachment feature comprising ceramic matrix composite material and arranged radially outward of the body and configured to be coupled to other components of the turbine shroud assembly when the blade track segment is assembled into the gas turbine engine, and wherein the ceramic matrix composite materials include a sheet of reinforcement material that has free ends configured to form at least part of the attachment feature and a midsection configured to wrap around the interior cavity and form at least part of the runner panel, the forward panel, and the aft panel of the body, wherein the sheet of reinforcement material includes end sections that axially diverge from one another as they extend radially outward from the midsection to the free ends and that form at least part of the attachment feature, wherein the attachment feature forms dovetail cross-sectional shape.

7. The blade track segment of claim 6, wherein the wherein the ceramic matrix composite materials include filler reinforcement material arranged circumferentially between the end sections of the sheet of reinforcement material, and wherein the sheet of reinforcement material and the filler reinforcement material are co-infiltrated with ceramic matrix material.

8. A blade track segment adapted for use in a turbine shroud assembly incorporated into a gas turbine engine, the blade track segment comprising a body comprising ceramic matrix composite material and formed to provide a polygonal cross-sectional shape defining an interior cavity, the body including a runner panel that extends partway around a central axis, a forward panel that extends radially outward and axially aft of a forward edge of the runner panel, and an aft panel that extends radially outward and axially forward of an aft edge of the runner panel, an attachment feature comprising ceramic matrix composite material and arranged radially outward of the body and configured to be coupled to other components of the turbine shroud assembly when the blade track segment is assembled into the gas turbine engine, and wherein the ceramic matrix composite materials include a sheet of reinforcement material that has free ends configured to form at least part of the attachment feature and a midsection configured to wrap around the interior cavity and form at least part of the runner panel, the forward panel, and the aft panel of the body, wherein the sheet of reinforcement material includes end sections that axially diverge from one another as they extend radially outward from the midsection to the free ends and that form at least part of the attachment feature, wherein the attachment feature forms a T-shaped cross-sectional shape.

9. A blade track segment adapted for use in a turbine shroud assembly incorporated into a gas turbine engine, the blade track segment comprising a body comprising ceramic matrix ceramic material and formed to provide a polygonal cross-sectional shape defining an interior cavity, the body including a runner panel that extends partway around a central axis, a forward panel that extends radially outward and axially aft of a forward edge of the runner panel, and an aft panel that extends radially outward and axially forward of an aft edge of the runner panel, an attachment feature comprising ceramic matrix ceramic material and arranged radially outward of the body and configured to be coupled to other components of the turbine shroud assembly when the blade track segment is assembled into the gas turbine engine, and wherein the ceramic matrix composite materials include a sheet of reinforcement material that has free ends configured to form at least part of the attachment feature and a midsection configured to wrap around the interior cavity and form at least part of the runner panel, the forward panel, and the aft panel of the body, wherein the forward panel of the body and the aft panel of the body converge, wherein the sheet of reinforcement material includes end sections that extend radially outward from the midsection of the sheet of reinforcement material to the free ends of the sheet of reinforcement material to form at least part of the attachment feature, and the attachment feature includes pins that extend axially through and beyond the end sections of the sheet of reinforcement material in forward and aft directions.

10. A blade track segment adapted for use in a turbine shroud assembly incorporated into a gas turbine engine, the blade track segment comprising a body comprising ceramic matrix composite material and formed to provide a triangular cross-sectional shape defining an interior cavity when viewed circumferentially around the central axis, the body including a runner panel that extends partway around a central axis, a forward panel that extends radially outward and axially aft of a forward edge of the runner panel, and an aft panel that extends radially outward and axially forward of an aft edge of the runner panel, an attachment feature comprising ceramic matrix composite material and arranged radially outward of the body and configured to be coupled to other components of the turbine shroud assembly when the blade track segment is assembled into the gas turbine engine, and wherein the ceramic matrix composite materials include a sheet of reinforcement material that has free ends configured to form at least part of the attachment feature and a midsection configured to wrap around the interior cavity and form at least part of the runner panel, the forward panel, and the aft panel of the body.

11. A blade track segment adapted for use in a turbine shroud assembly incorporated into a gas turbine engine, the blade track segment comprising a body comprising ceramic matrix composite material and formed to provide a triangular cross-sectional shape defining an interior cavity when viewed circumferentially around the central axis, the body including a runner panel that extends partway around a central axis, a forward panel that extends radially outward and axially aft of a forward edge of the runner panel, and an aft panel that extends radially outward and axially forward of an aft edge of the runner panel, an attachment feature comprising ceramic matrix composite material and arranged radially outward of the body and configured to be coupled to other components of the turbine shroud assembly when the blade track segment is assembled into the gas turbine engine, and wherein the ceramic matrix composite materials include a tube of reinforcement material constructed so as not to include a seam, and wherein the tube of reinforcement material is shaped to surround the interior cavity of the body and forms at least part of the body.

12. A blade track segment adapted for use in a turbine shroud assembly incorporated into a gas turbine engine, the blade track segment comprising a body comprising ceramic matrix composite material and formed to provide a polygonal cross-sectional shape defining an interior cavity, the body including a runner panel that extends partway around a central axis, a forward panel that extends radially outward and axially aft of a forward edge of the runner panel, and an aft panel that extends radially outward and axially forward of an aft edge of the runner panel, an attachment feature comprising ceramic matrix composite material and arranged radially outward of the body and configured to be coupled to other components of the turbine shroud assembly when the blade track segment is assembled into the gas turbine engine, and wherein the ceramic matrix composite materials include a tube of three-dimensionally woven reinforcement material constructed so as not to include a seam, and wherein the tube of reinforcement material is shaped to surround the interior cavity of the body and forms at least part of the body and at least part of the attachment feature, wherein the attachment feature forms one of a dovetail cross-sectional shape and a T-shaped cross-sectional shape.

13. A blade track segment adapted for use in a turbine shroud assembly incorporated into a gas turbine engine, the blade track segment comprising a body comprising ceramic matrix composite material and formed to provide a polygonal cross-sectional shape defining an interior cavity, the body including a runner panel that extends partway around a central axis, a forward panel that extends radially outward and axially aft of a forward edge of the runner panel, and an aft panel that extends radially outward and axially forward of an aft edge of the runner panel, an attachment feature comprising ceramic matrix composite material and arranged radially outward of the body and configured to be coupled to other components of the turbine shroud assembly when the blade track segment is assembled into the gas turbine engine, and wherein the ceramic matrix composite materials include a tube of reinforcement material constructed so as not to include a seam, and wherein the tube of reinforcement material is shaped to surround the interior cavity of the body and forms at least part of the body, wherein the ceramic matrix composite materials include a sheet of reinforcement material wrapped around the tube of reinforcement material and the interior cavity to form at least part of the body, and wherein the tube of reinforcement material and the sheet of reinforcement material are co-infiltrated with ceramic matrix material.

14. The blade track segment of claim 13, wherein the tube of reinforcement material and the sheet of reinforcement material each form at least part of the attachment feature, and wherein the attachment feature includes pins that extend through and beyond portions of the tube of reinforcement material and the sheet of reinforcement material included in the attachment feature.

* * * * *